(12) United States Patent
Butala et al.

(10) Patent No.: US 8,755,802 B1
(45) Date of Patent: Jun. 17, 2014

(54) UMTS RESELECTION PERFORMANCE IN SMALL CELL SYSTEMS

(71) Applicant: SpiderCloud Wireless, Inc., San Jose, CA (US)

(72) Inventors: Amit Butala, Sunnyvale, CA (US); Hithesh Nama, San Jose, CA (US); Pete Worters, San Carlos, CA (US)

(73) Assignee: SpiderCloud Wirelss, Inc., San Jose, CA (US)

( * ) Notice: Subject to any disclaimer, the term of this patent is extended or adjusted under 35 U.S.C. 154(b) by 0 days.

(21) Appl. No.: 13/726,991

(22) Filed: Dec. 26, 2012

(51) Int. Cl.
*H04W 36/00* (2009.01)

(52) U.S. Cl.
USPC ............ 455/437; 455/436; 455/444; 455/451

(58) Field of Classification Search
None
See application file for complete search history.

(56) References Cited

U.S. PATENT DOCUMENTS

2013/0295879 A1* 11/2013 Mahalingam ................. 455/410

\* cited by examiner

*Primary Examiner* — Suhail Khan
(74) *Attorney, Agent, or Firm* — Mark D. Wieczorek; Mayer & Williams PC (57) ABSTRACT

A beacon cell adapted for use in a small cell RAN includes dual identities—a beacon identity and a regular or "live" identity—in which the identities are individually configured to address differing performance requirements in the small cell RAN. The beacon identity in the cell is specially configured to meet the performance requirements for mobile user equipment (UE) to be able to quickly and easily move from a macrocell base station in a mobile operator's network to the small cell RAN using a process called "reselection." The live identity is configured to meet all requirements for service to be provided to the UE within the small cell RAN. Once captured by the beacon identity of the beacon cell, the UE can then immediately reselect to the live identity of the cell which operates in a conventional manner.

26 Claims, 9 Drawing Sheets

UMTS RESELECTION PERFORMANCE IN SMALL CELL SYSTEMS

BACKGROUND

Operators of mobile systems such as Universal Mobile Telecommunications Systems (UMTS) are increasingly relying on wireless small cell radio access networks (RANs) in order to deploy indoor voice and data services to enterprises and other customers. Such small cell RANs typically utilize multiple-access technologies capable of supporting communications with multiple users using radio frequency (RF) signals and sharing available system resources such as bandwidth and transmit power. While such small cell RANs operate satisfactorily in many applications, there exists a need for further improvements in small cell RAN technologies.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A beacon cell adapted for use in a small cell RAN includes dual identities—a beacon identity and a regular or "live" identity—in which the identities are individually configured to address differing requirements in the small cell RAN. The beacon identity in the cell is specially configured to meet the requirements for mobile user equipment (UE) such as mobile phones, smartphones, tablets, etc., to be able to quickly and easily move from a macrocell base station in a mobile operator's network to the small cell RAN using a process called "reselection." Reselection can be utilized, for example, when the equipment user moves from an outdoor area within the radio coverage of the macrocell into a building serviced by the small cell RAN. Once the UE is associated with the small cell RAN, the beacon identity is no longer used to control the UE. Instead, the beacon cell internally switches the UE from the beacon identity to the live identity. The live identity is configured to meet all requirements for service to be provided to the UE within the small cell RAN. Thus, the present beacon cell advantageously enables rapid reselection of a UE from the macrocell to the small cell RAN and then provides the same level of RAN service to the UE in the small cell RAN as would a conventional small cell.

Due to the predetermined configuration of macrocells, reselection requires a reserved primary scrambling code (PSC) for cell identification, termed a "magic PSC" in the description that follows. There are usually very few, for example six, magic PSCs available in typical applications. However, since reselection does not rely on cell disambiguation (as needed for other RAN services) a PSC in a beacon identity can be reused without any risk of disambiguation failure. In addition, the beacon identity can be broadcast with reduced power and lower signal quality so long as the broadcast channels remain decodable over an acceptable fraction of the coverage area of the beacon cell. By contrast, the live identities of all cells in the small cell RAN cannot typically be satisfactorily configured using just the magic PSCs and thus they require other (i.e., non-magic) PSCs. The live identities thus use a relatively large set of PSCs and can operate at normal power and signal quality levels to facilitate satisfactory quality-of-service and cell disambiguation for RAN service. The reduced power level of the beacon identity reduces the opportunity for RF interference with the live identity but still enables rapid reselection to the small cell RAN from the macrocell. Once captured by the beacon identity of the beacon cell, the UE can then immediately reselect to the live identity of the cell which operates in a conventional manner including, for example, handover to neighboring cells in the small cell RAN as the UE moves through the service area.

In various illustrative examples, each deployed beacon cell is configured to reuse (i.e., commonly share) the same magic PSCs. As the number of magic PSCs that are reserved for reselection is strictly limited, the present beacon cell advantageously broadens the footprint of cells in the small cell RAN that are equipped to capture UEs from the macrocell via reselection because many or all of the cells in a given deployment can be beacon cells.

The beacon identity will typically broadcast only to the minimum requirements for reselection by reconfiguring several physical and transport channels in the downlink to the UE Timing and power utilization of the beacon cell are also manipulated to further optimize reselection performance. The beacon identity may also be adapted for selective and/or dynamically configurable operation using a duty cycle, for example, or be operated in response to conditions on the small cell RAN such as UE loading.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
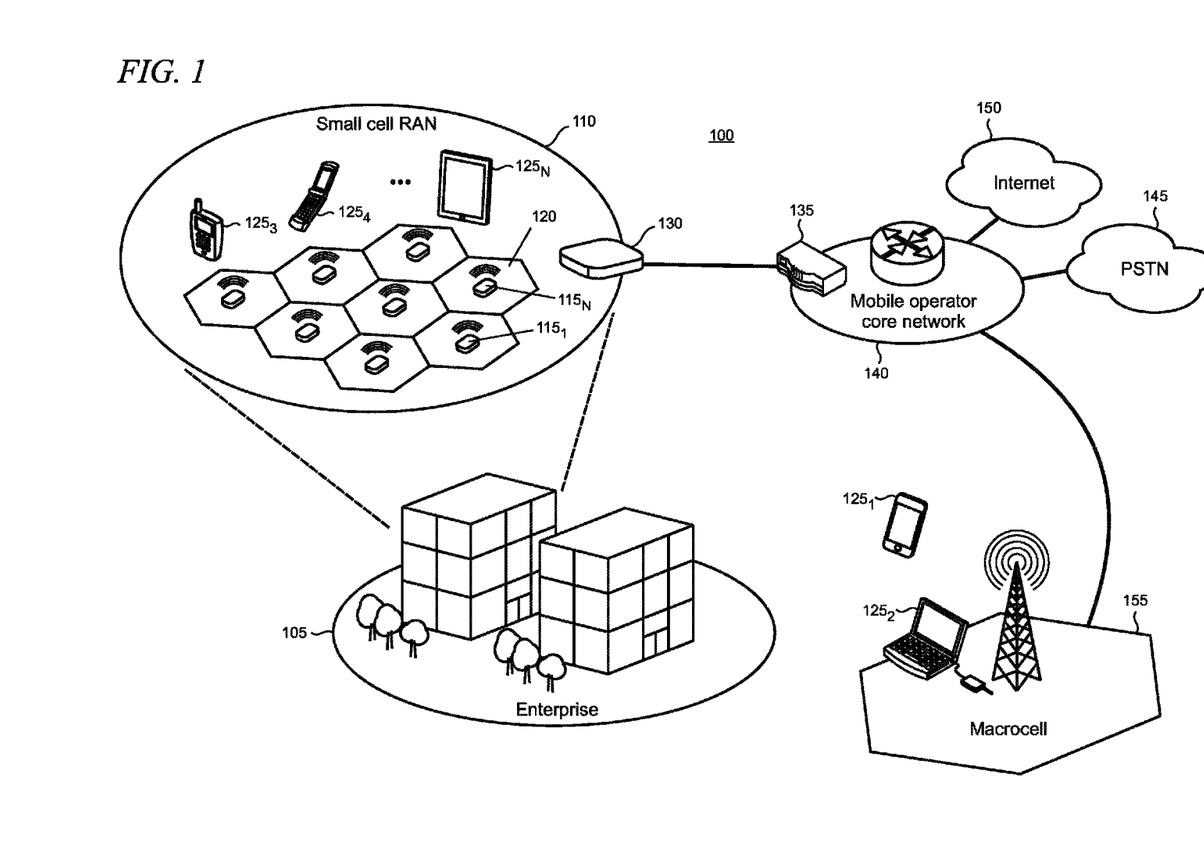
FIG. 1 shows an illustrative mobile telecommunications environment in which the present small cell reselection performance improvement may be practiced.

FIG. 1 shows an illustrative mobile telecommunications environment 100 in which the present small cell reselection performance improvement may be practiced. The mobile telecommunications environment 100, in this illustrative example, is arranged as a Universal Mobile Telecommunications System (UMTS) as described by the Third Generation Partnership Project (3GPP), although it is emphasized that the present principles described herein may also be applicable to other network types and protocols. The environment 100 includes an enterprise 105 in which a small cell RAN 110 is implemented. The small cell RAN 110 includes a plurality of radio nodes $115_1 \ldots _N$. Each radio node 115 has a radio coverage area (graphically depicted in the drawings as a hexagonal shape) that is commonly termed a small cell. Thus, the small cell RAN 110 may be viewed as a small cell network, i.e., a portion of a UMTS Terrestrial Radio Access Network (UTRAN) under 3GPP. A small cell may also be referred to as a femtocell, or using terminology defined by 3GPP as a Home NodeB. In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals $125_{1-N}$ in FIG. 1). However, the foregoing is intended to be illustrative and the small cell reselection performance improvement can be typically expected to be readily scalable either upwards or downwards as the needs of a particular usage scenario demand.

In this particular illustrative example, the small cell RAN 110 includes one or more services nodes (represented as a single services node 130 in FIG. 1) that manage and control the radio nodes 115. In alternative implementations, the management and control functionality may be incorporated into a radio node, distributed among nodes, or implemented remotely (i.e., using infrastructure external to the small cell RAN 110). The radio nodes 115 are coupled to the services node 130 over a direct or local area network (LAN) connection (not shown in FIG. 1) typically using secure IPsec tunnels. The services node 130 aggregates voice and data traffic from the radio nodes 115 and provides connectivity over an IPsec tunnel to a gateway 135 in a core network 140 of a mobile operator. The core network 140 is typically configured to communicate with a public switched telephone network (PSTN) 145 to carry circuit-switched traffic, as well as for communicating with a packet-switched network such as the Internet 150.

The environment 100 also generally includes UTMS Node B base stations, or "macrocells", as part of the UTRAN as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve UTRAN connectivity through either a macrocell or small cell in environment 100.

Figure 2:
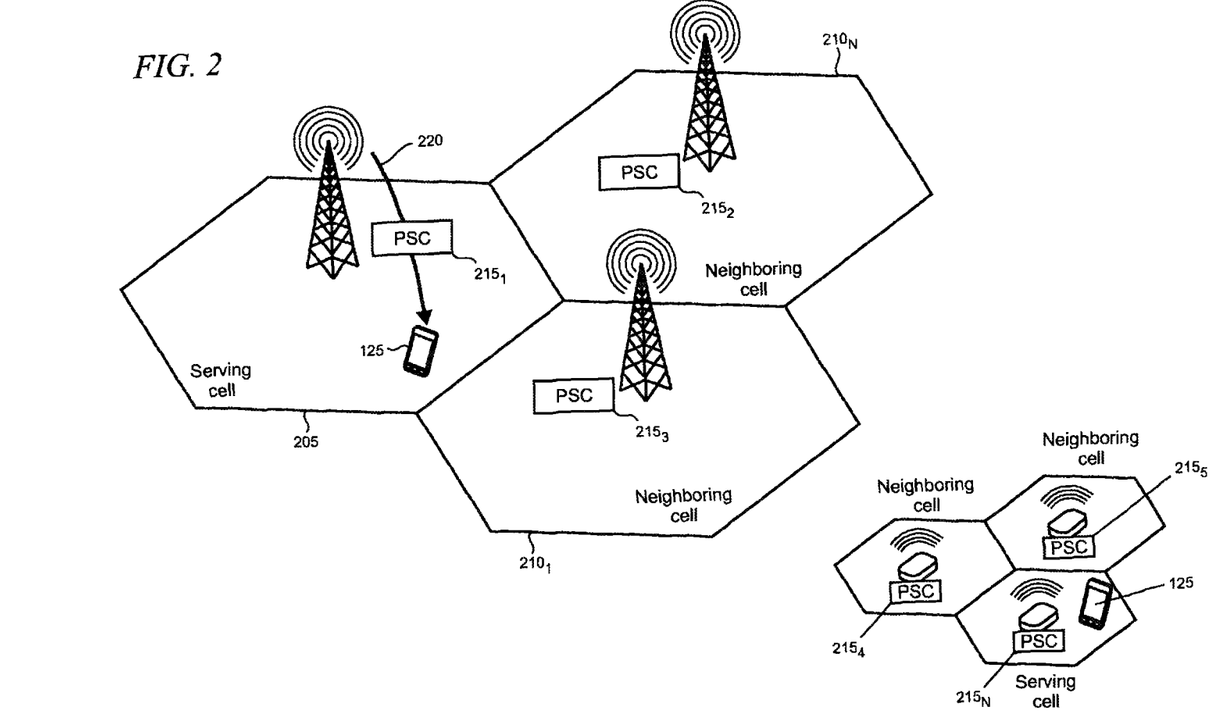
FIG. 2 shows how a primary scrambling code (PSC) is utilized to uniquely identify cells to user equipment (UE) where cells can include a serving cell and neighboring cells.

A UE 125 connected to the UMTS network environment 100 will actively or passively monitor a UTRAN cell. As shown in FIG. 2, such a cell is termed the "serving cell" 205 and as the UE 125 moves throughout the environment 100, it will continually evaluate the quality of the serving cell as compared with that of neighboring cells 210. As shown, both small cells and macrocells can identify themselves to the UE 125 using a unique primary scrambling code (PSC) 215 that is transmitted over a downlink to a UE as representatively indicated by reference numeral 220. By using different PSCs, neighboring cells 210 may thus be disambiguated from the serving cell 205.

Figure 3:
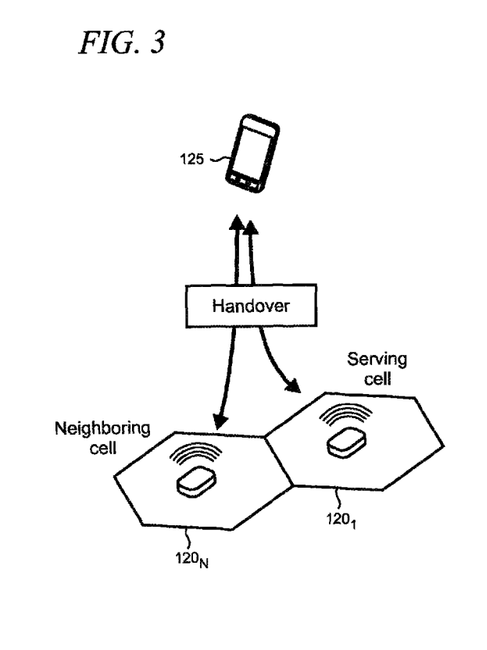
FIGS. 3 and 4 respectively show two different ways in which a serving cell may be changed.

There are two different ways in the UMTS network environment 100 (FIG. 1) in which the serving cell may be changed. For a UE in active communications, called the Cell_DCH state using 3GPP terminology, the serving cell changes are controlled by the network using a process termed "handover." As shown in FIG. 3, handover between small cells 120 in the small cell RAN 110 is supported in a UMTS network to provide RAN service to the UE (RAN service may also utilize reselection in some cases). However, handover between a macrocell and a small cell is typically unsupported in many UMTS deployments. Instead, for UEs 125 that are inactive or passively communicating with the network, the UEs autonomously select a new serving cell, through a process called "reselection." While the reselection process is autonomous, it is steered based on parameters broadcast by the current serving cell. These parameters are signaled on the BCH (broadcast channel under 3GPP) channel and indicate the neighboring cell PSCs and signal quality at which reselection is permitted.

Figure 4:
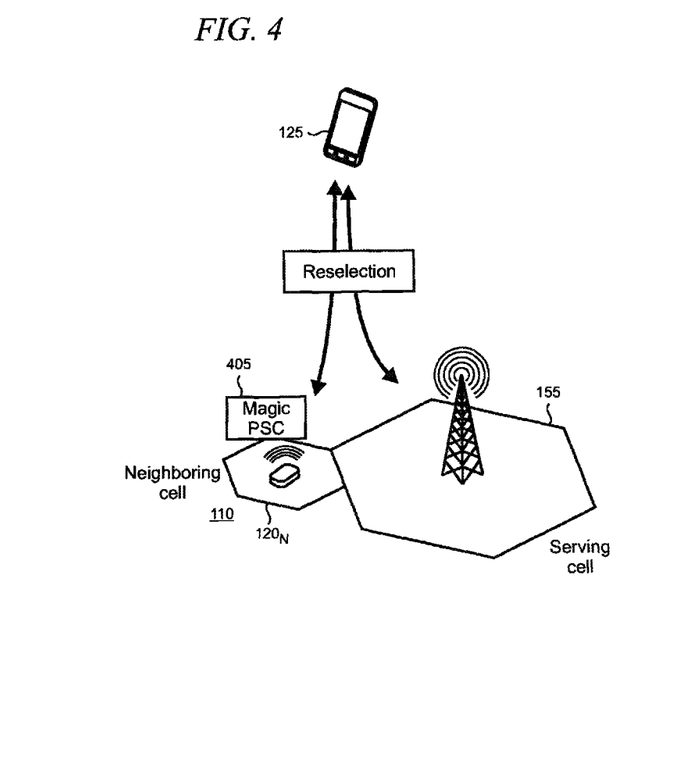

Accordingly, reselection is typically the only path over which UEs 125 can detect the small cell RAN 110 and switch over from the macrocell 155 to a small cell 120, as shown in FIG. 4. There are several usage scenarios in which a user would need to reselect to the small cell RAN 110. These include, for example:

1. Ingress: This is a dominant scenario in which a user in the exterior of the small cell RAN moves into the small cell RAN.
2. Redirect: In the case of overload, the small cell RAN redirects users to the macrocell. This affects UEs not just when establishing voice traffic, but also UEs handling background packet-switched traffic. Typically, it can be expected that the macrocell coverage would be marginal, but once on the macrocell, the UE will not return to the small cell RAN except through the reselection procedure. A given small cell RAN may also have adequate capacity for voice, but if under-dimensioned for packet-switched traffic, may still bleed users to the macrocell, and those users would continue to remain on the macrocell when establishing voice calls.
3. Coverage holes: The coverage from the small cell RAN may not be consistent. For example, laboratories, elevators, atriums, and other locations in the enterprise may have localized coverage issues that result in loss of users to the macrocell.
4. System issues: Radio system reboots, loss of core network connectivity, etc., could result in affected users reselecting to the macrocell.

If reselection performance is not satisfactory, the small cell RAN will see lower than desired utilization, resulting in continued overload on the macrocell network and poorer user experience in-building.

Typically, the macrocells in the UMTS network usually reserve a small set of PSCs for permitting reselection by UEs 125 to the small cell RAN 110 (FIG. 1). The PSCs are colloquially known as "magic PSCs" because they have special properties—the UE 125 will reselect to a cell 120 in the small cell RAN 110 identified by a magic PSC even at low "quality" levels, for example, very low RSCP (received signal code power) and SNR (signal-to-noise ratio) levels, thereby accelerating the reselection of the UE to cells using these magic PSCs. A representative magic PSC 405 is shown in FIG. 4.

Conversely, while some cells 120 in the small cell RAN 110 can use regular (i.e., non-magic PSCs), a UE 125 on the macrocell 155 will never reselect to a small cell RAN cell 120 that uses a non-magic PSC, regardless of the quality of the non-magic PSC. However, once on the small cell RAN 110, the UEs 125 may handover or reselect to a cell having any PSC, including non-magic PSC. Since it is typically desirable to redirect users to the small cell RAN as soon as they enter the coverage area of the small cell RAN for the reasons discussed above, small cells identified by a magic PSC are often located at points within the enterprise 105 where such cells can influence the reselection from the macrocell 155 for the largest fraction of users.

In typical current implementations of small cell networks (i.e., those not utilizing the present small cell reselection performance improvement), the configuration of cells having magic PSCs within the small cell RAN often needs to be carefully implemented because the quality of magic PSC assignments determines the reselection-in performance for the small cell RAN. The configuration process typically entails two steps. The first step comprises manual configuration of those cells using magic PSCs by setting an appropriate parameter in the radio node. As noted above, cells at the ingress routes to the small cell RAN (e.g., entrances to the enterprise) and cells in common areas (lobbies, atriums, cafeterias, etc.) are recommended as prime candidates to improve the overall system reselection performance. The second step comprises a REM (radio environment measurement) scan and PSC assignment. This is an automated process that generally determines the best PSC to be used by a cell based on RF and topology considerations.

While the configuration steps discussed above can provide satisfactory results in many network implementations, the manual configuration can often increase the complexity of the installation since it requires knowledge of the building floor plans, adds additional installation and configuration steps, and may be prone to errors. More particularly, insufficient allocation of magic PSCs can result in UEs remaining on the macrocell which has degraded even though they are in the coverage area of the small cell RAN. In addition, a dense allocation of magic PSCs can result in disambiguation failures, which, while improving reselection behavior, would degrade handover performance.

Figure 5:
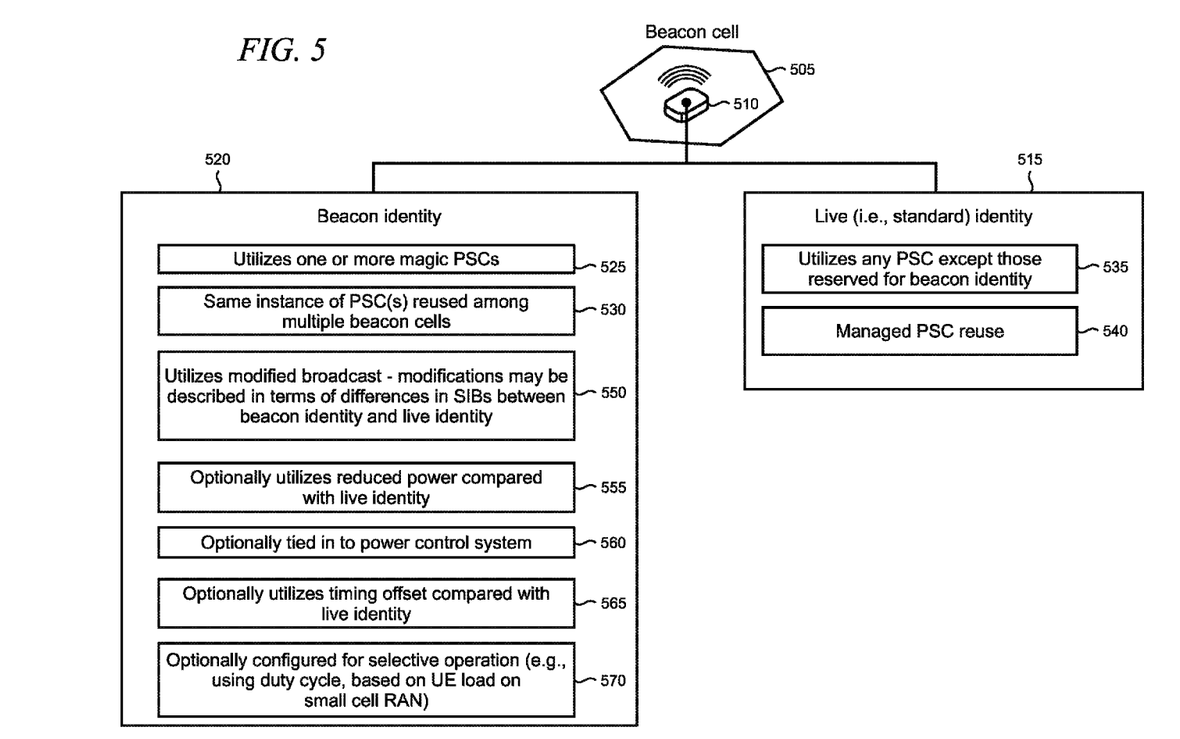
FIG. 5 shows illustrative features and characteristics which are incorporated into a beacon cell which may be utilized to implement the present small cell reselection performance improvement.

Such issues may be addressed by a beacon cell that is arranged to improve reselection performance in small cell systems such as the small cell RAN 110 shown in FIG. 1 and described in the accompanying text. As shown in FIG. 5, a beacon cell 505 includes a radio node 510 that is specially configured to have two distinct identities. One identity is a beacon identity in which the beacon cell 505 can function and behave as a beacon that is specifically intended to capture UEs from the macrocell via reselection using a magic PSC. The other identity is the standard or "live" identity in which the beacon cell 505 can function and behave conventionally as a regular small cell to provide RAN service to a UE once it is associated with the small cell RAN. In some usage scenarios, the beacon cell 505 supports both identities simultaneously, while in other scenarios the beacon identity is utilized on a selective basis, as described in more detail below. Beacon cells may be used to supplement cells that are identified with magic PSCs in a given small cell RAN deployment, or replace such magic PSC cells in their entirety in some cases. Similarly, beacon cells can be used to supplement regular cells in a given small cell RAN deployment, or replace such cells in some cases.

The configuration of the beacon cell 505 with dual identities results, at least in part, from the recognition that RAN service and reselection from a macrocell have differing performance requirements. Reselection from a macrocell requires a magic PSC but does not rely on cell disambiguation. Additionally, as long as the broadcast channels are decodable, the overall quality of the cell is not important. By contrast, after the UE becomes associated with the small cell RAN via the beacon identity, the provision of RAN service does not require a magic PSC, but does require cell disambiguation.

Accordingly, in view of the foregoing recognition, the beacon identity 520 may include a number of features and characteristics, as shown in FIG. 5. The beacon identity 520 utilizes one or more magic PSCs (as indicated by reference numeral 525). In some cases, the same particular magic PSC (e.g., one of six reserved PSCs in one illustrative implementation scenario) is reused by each of the beacon cells 505 in a small cell RAN, while in other cases, two, three, or up to all six of the magic PSCs are utilized in the beacon cells with varying degrees of reuse (530). For example, three magic PSCs may be reused across multiple beacon cells, while two magic PSCs are utilized in single instances, and the sixth magic PSC is not utilized in a beacon cell and reserved for other uses. Note, however, that it may be desirable in some implementations to maintain backwards compatibility by reusing a single magic PSC for beacon cells while reserving the remaining five magic PSCs for conventional usage. In the event that handover from a macrocell to a small cell RAN is supported in the future, some live identities can be configured with magic PSCs that are not used by any beacon identities in order to also provide a path of handover from macrocells to the small cell RAN. In most typical small cell RAN implementations, once a magic PSC is selected for beacon cell use it should not be configured for use by any other non-beacon cells.

The live identity 515, by comparison to the beacon identity 520, uses regular, non-magic PSCs (as indicated by reference numeral 535). Each live identity in a beacon cell uses a spatially unique PSC and PSC reuse is carefully managed (540). For example, in some implementations, it may be desirable to reuse PSCs for the live identities as infrequently as possible.

Figure 6:
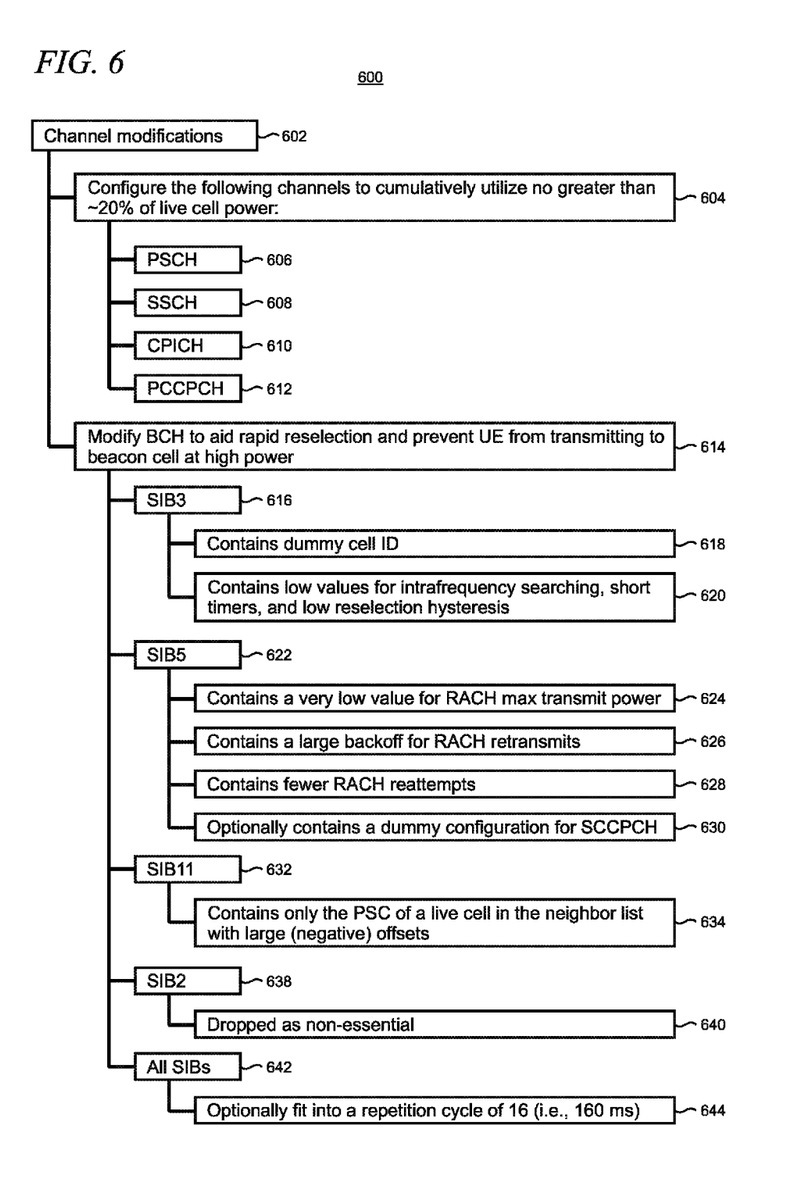
FIG. 6 is an illustrative taxonomy of modifications that may be utilized to implement aspects of beacon cell functionality.

In order to reduce interference between the beacon and live identities when both identities are simultaneously utilized, channel powers can typically become critically important. Accordingly, the beacon identity 520, in comparison to the live identity 515 which broadcasts conventionally, uses a modified broadcast (550) where such modifications can be described in terms of differences in the SIBs (System Information Blocks) between the beacon identity and live identity. FIG. 6 shows an illustrative taxonomy 600 of modifications (as indicated by reference numeral 602) that may be made to several physical and transport channels in the downlink between the beacon cell and a UE to enable such broadcast to minimum requirements for reselection. Such enablement entails configuring certain physical channels to cumulatively utilize no greater than approximately 20% of regular live cell power (604). The reconfigured physical channels include PSCH (Primary Synchronization Channel), SSCH (Secondary Synchronization Channel), CPICH (Common Pilot Channel), and PCCPCH (Primary Common Control Physical Channel), as respectively indicated by reference numerals 606, 608, 610, and 612.

The BCH (Broadcast Channel) may also be configured to aid rapid reselection and prevent a UE from transmitting to the beacon cell at high power (614). In particular, certain SIBs can be modified: SIB3 (616) may be modified to contain a dummy cell ID (618). It may be possible to reuse the same dummy cell ID for all beacon identities across cells in a given small cell RAN deployment. SIB3 may be further configured to contain low values for intrafrequency searching, short timers, and low reselection hysteresis (620).

SIB5 (622) may be configured to contain a relatively low value for RACH (Random Access Channel) maximum transmit power (624), a relatively large backoff for RACH retransmits (626), and fewer RACH reattempts (628). SIB5 may be optionally configured, in some implementations, to contain a dummy configuration for SCCPCH (Secondary Common Control Physical Channel) (630).

SIB11 (632) may be configured to contain only one neighboring cell via the PSC of a live cell in the neighbor list having large (negative) offsets (634). SIB2 (638) may be dropped as non-essential (640). Each of the SIBs (642) may be optionally configured to fit into a repetition cycle of 16 (i.e., 160 ms) to further expedite the reselection process by reducing the time required for SIB inspection (644).

Returning again to FIG. 5, as noted above, the beacon identity 520 can present interference with the live identity 515 which can limit the total power available to the cell's normal operation and thus potentially have some nominal impact on cell capacity in some cases. Typically, the BCH can be decoded by a UE as low as −17 dB chip SNR. Accordingly, the beacon identity 520 can be configured about 5 dB lower than the live identity 515 and thus the power utilization of the beacon identity can be lowered to approximately 6% of the total cell power (as indicated by reference numeral 555). Various control schemes may also be implemented to allow for dynamic power management of the beacon identity 520, for example, using a new control or by a tie-in (560) to an existing control system or sub-system incorporated in the radio node or external to the node, for example, the downlink power manager or HSDPA (High-Speed Downlink Packet Access) power harvesting module. Under such control, the beacon identity may be powered up and down in an opportunistic manner.

In another illustrative example, in a completely unloaded small cell RAN the CPICH of the beacon identity can have substantially the same power level as the live identity CPICH so as to have the same footprint for both reselection and normal RAN service operation. In this case, when a UE moves within the small cell RAN, there will be a possibility of it reselecting briefly to the beacon identity of an adjoining beacon cell, which should be avoided when possible. To this end, all beacon cells in a small cell RAN may advertise a magic PSC in their neighbor list in SIB11 with a relatively large hysteresis. This can be expected to prevent such a reselection to the adjoining beacon identity once the UE is within the small cell RAN in many scenarios. It is also possible that the reselection to the adjoining beacon identity may even be prevented in cases when the UE goes into a coverage hole and returns back to the small cell RAN after going to the macrocell or through a full scan of all PSCs.

A nominal timing offset of a few chips between the beacon and live identities may also be utilized to compensate for the observation that some UEs may have difficulty detecting the lower power beacon signal having the same timing as a stronger signal from the live identity (565).

The beacon identity 520 may further be optionally configured to be selectively operated (570). That is, the beacon cell 505 can have both the beacon and live identities operating simultaneously, or the beacon identity can be selectively switched off so that the beacon cell 505 essentially defaults to conventional live cell behavior with no support for reselection in from the macrocell. Such selective operation could be implemented, for example, using a duty cycle methodology or via coupling to a control that has awareness of external conditions such as UE loading on the small cell RAN, or throughput requirements of users attached to the live identity of the small cell.

Other optional configurations may include enabling an AICH (Acquisition Indicator Channel) and sending NACKs (non-acknowledgements) on the AICH to prevent UEs from attempting to PRACH (physical random access channel) on the beacon identity, and enabling an SCCPCH (Secondary Common Control Physical Channel) and using RRC (Radio Resource Control) reject messages to influence UE behavior.

Figure 7:
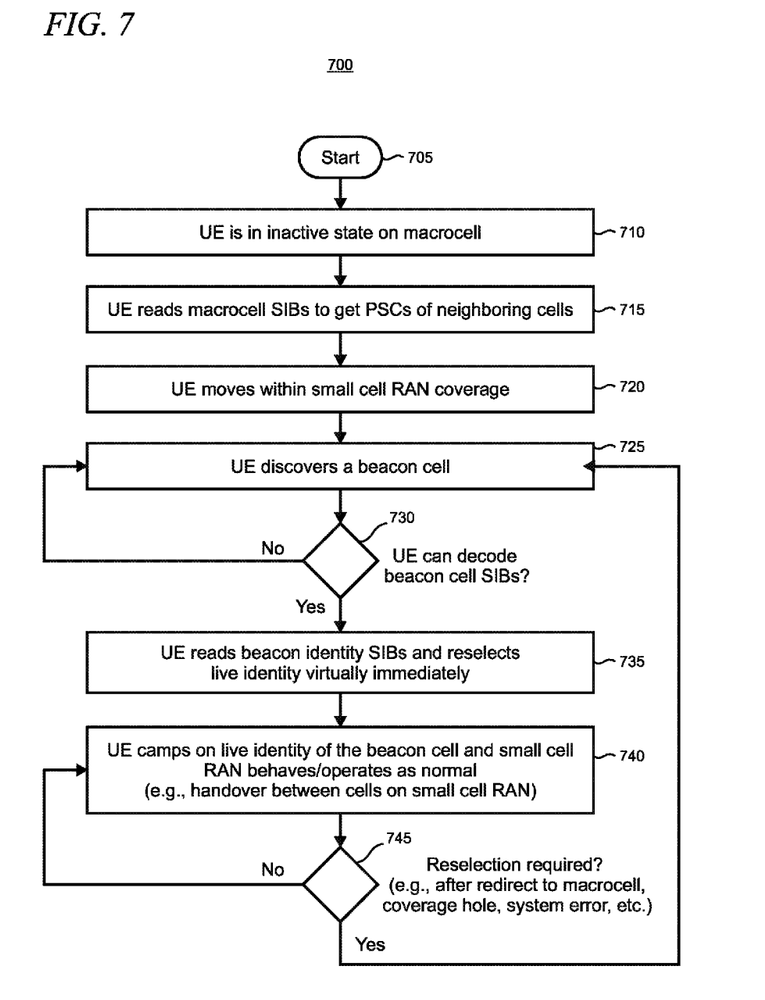
FIG. 7 is a flowchart of an illustrative method for improved reselection performance using a beacon cell.

FIG. 7 is a flowchart of an illustrative method 700 for improved reselection performance using multiple instances of the beacon cell 505 shown in FIG. 5 and described in the accompanying text when deployed in a small cell RAN. It should be understood that the specific order or hierarchy of the steps in the method disclosed is an illustration of exemplary approaches. Based upon design preferences, it is understood that the specific order or hierarchy of steps in the method may be rearranged. The accompanying method claims present elements of the various steps in a sample order, and are not meant to be limited to the specific order or hierarchy presented. The method starts at block 705. A UE is in an inactive state on a macrocell at block 710. At block 715, the UE reads SIBs from the macrocell to get the PSCs of the neighboring cells for reselection. As discussed above, magic PSCs are utilized by cells that support reselection. When the UE moves into small cell RAN coverage, at block 720, it will discover a beacon cell, at block 725.

If the UE can decode the beacon identity SIBs at decision block 730, then control passes to block 735 and the UE will reselect the live identity virtually immediately. If the UE cannot decode the beacon cell SIBs for any reason, the UE will continue to stay on the macrocell and control passes back to block 725 and the UE will discover another beacon cell and the above steps are repeated until a live identity in a beacon cell is successfully reselected. Because utilization of beacon cells typically enables a reselection beacon to be broadcast over a relatively large area from many or all of the cells in the small cell RAN, capture of UEs from the macrocell to the small cell RAN is significantly enhanced. And any UEs that leak out to the macrocell can typically be expected to be quickly re-acquired by the beacon cell-equipped small cell RAN.

When a live identity is successfully reselected, then the UE will camp on that beacon cell and the small cell RAN will behave and operate as normal, as shown at block 740. For example, the UE will move from a serving cell to a neighboring cell in the small cell RAN using normal handover. In some cases, even when the UE is in the coverage area of the small cell RAN, it may still not be associated with the small cell RAN and additional occurrences of reselection from the macrocell to the small cell RAN may need to occur. For example, as discussed above, reselection may be needed subsequent to a UE being directed to a macrocell due to a coverage hole, overload, system error/reboot, or the like. In such cases, control is returned from decision block 745 back to block 725, and the method shown in blocks 725-745 is repeated.

Figure 8:
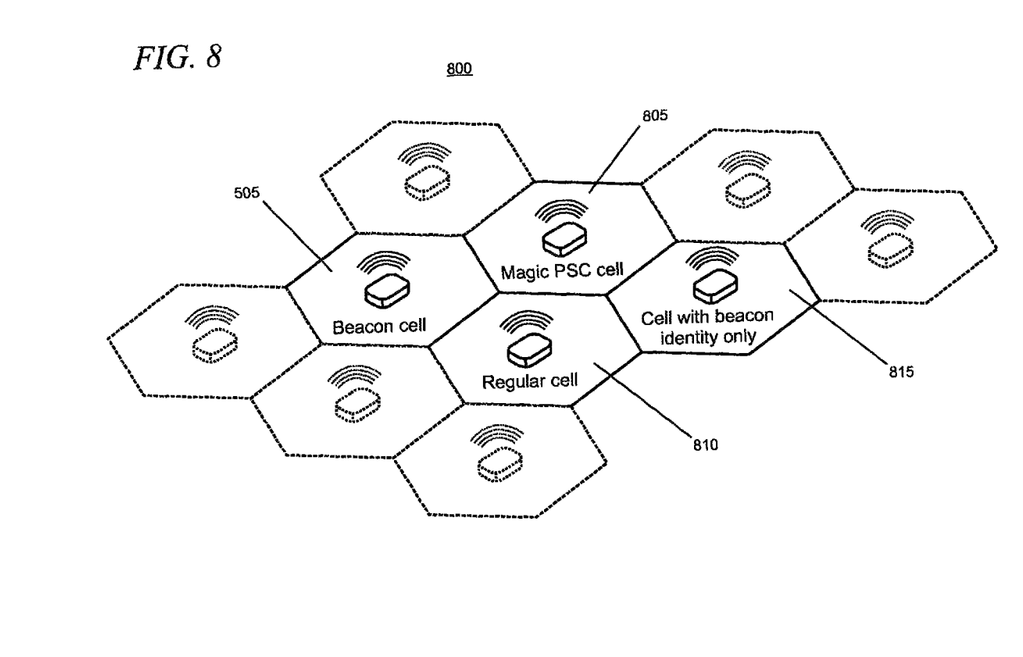
FIG. 8 illustratively shows how a small cell RAN (Radio Access Network) may include a mix of cell types.

FIG. 8 illustratively shows how a small cell RAN 800 may include cells selected from different cell types. The cell types include: (1) beacon cells 505; (2) non-beacon cells which are identified using a magic PSC, termed "magic PSC cells" here and indicated by reference numeral 805 in FIG. 8, (3) regular, non-beacon cells which are identified using regular PSCs (i.e., non-magic PSCs), termed "regular cells" here and indicated by reference numeral 810, and (4) a small cell that has a beacon identity only and no live identity, as indicated by reference numeral 815. It is noted that all cell types could be designed and constructed, in some implementations, to share a single common physical platform but differ in beacon functionality according to variable configuration settings. In some cases, such settings may be selectable via executable software on the cell or remote control (e.g., from the services node 130 shown in FIG. 1, or at a location that is remote from the small cell RAN), or selected via firmware and/or hardware, or various combinations of software, firmware, and hardware.

In one illustrative deployment scenario using mixed cell types, the beacon cells 505 are arranged to commonly share a single magic PSC thus enabling the maximum number of discrete magic PSC cells 805 to also be utilized in the small cell RAN 800. In this scenario, the magic PSC cells are configured and deployed using conventional manual techniques. No regular cells 810 are utilized as all of the cells in the small cell RAN 800, other than the magic PSC cells, are configured as beacon cells 505.

In a second illustrative deployment scenario using mixed cell types, beacon cells 505 and magic PSC cells 805 are configured and deployed in a small cell RAN in a similar manner as in the first scenario. Regular cells 810 are also utilized in certain locations in the enterprise where reselection to the small cell RAN from the macrocell may be undesired (for example, when a cell bleeds out beyond its desired coverage area over a pedestrian walkway).

In a third illustrative deployment scenario using mixed cell types, the cell 815 with beacon identity only can be used to overlay an existing small cell RAN deployment of regular cells 810 and magic PSC cells 505. The foregoing deployment scenarios are intended to be illustrative and deployment scenarios using other combinations of cell types and configurations are envisioned as required to meet the needs of a given implementation.

Figure 9:
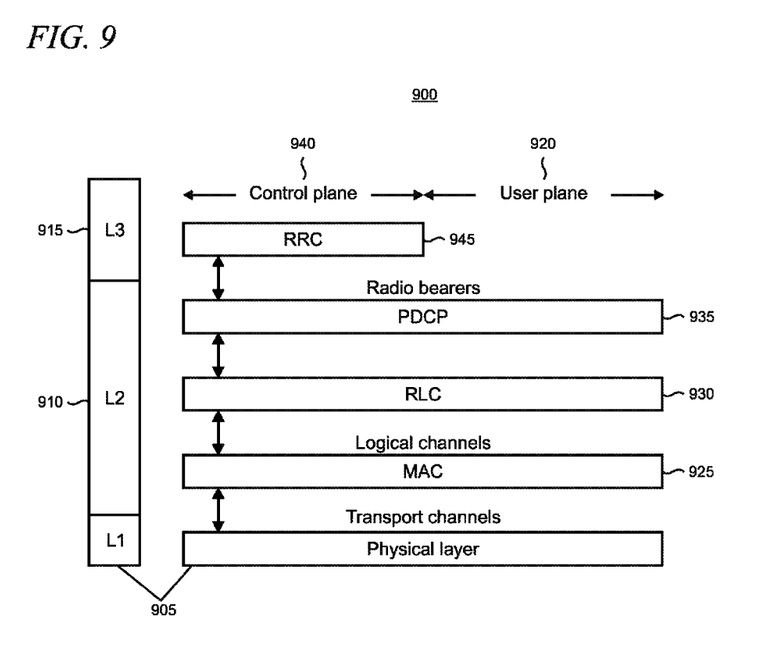
FIG. 9 shows an illustrative radio interface protocol architecture (3GPP TS 25.301)

FIG. 9 shows an illustrative radio interface protocol architecture 900 that is arranged in accordance with 3GPP TS 25.201 and which may be used to facilitate implementation of various aspects of the present beacon cell (e.g., beacon cell 505 in FIG. 5). The architecture 900 is arranged in three protocol layers: the physical layer (L1) as indicated by reference numeral 905; the data link layer (L2) 910; and the network layer (L3) 915. The L2 layer 910 above the L1 layer 905 is responsible for the link between the UEs and beacon cells over the L1 layer. In the user plane 920, the L2 layer 910 includes a media access control (MAC) sublayer 925, a radio link control (RLC) sublayer 930, and a packet data convergence protocol (PDCP) sublayer 935, which are terminated at the beacon cell on the network side.

The PDCP sublayer 935 provides header compression for upper layer data packets to reduce radio transmission overhead and handover support for UEs between small cells. The RLC sublayer 930 provides segmentation and reassembly of upper layer data packets, retransmission of lost data packets, and reordering of data packets to compensate for out-of-order reception due to hybrid automatic repeat request (HARQ). The MAC sublayer 925 provides multiplexing between logical and transport channels. The MAC sublayer 925 is also responsible for allocating the various radio resources (e.g., resource blocks) in one cell among the UEs. The MAC sublayer 925 is also responsible for HARQ operations.

In the control plane 940, the radio interface protocol architecture 900 is substantially the same for the physical layer 905 and the L2 layer 910 with the exception that there is no header compression function for the control plane. The control plane also includes a radio resource control (RRC) sublayer 945 in the L3 layer 915. The RRC sublayer 945 is responsible for obtaining radio resources (i.e., radio bearers) and for configuring the lower layers using RRC signaling between the beacon cell and the UE.

Figure 10:
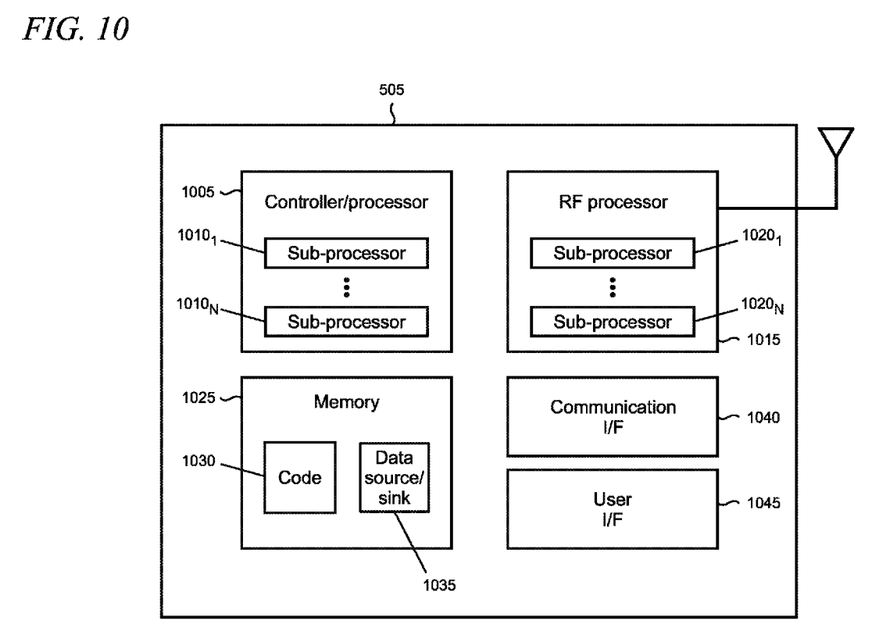
FIG. 10 shows a simplified functional block diagram of illustrative hardware infrastructure for a radio node that may be utilized to implement the present beacon cell.

FIG. 10 shows a simplified functional block diagram of illustrative hardware infrastructure for a radio node (e.g., radio node 510 in FIG. 5) that may be utilized to implement the present beacon cell 505. It is emphasized at the outset that the various discrete elements shown are intended to be illustrative, and that functionalities provided by a given element may be combined with those provided by another element, for example, as a matter of design preference. In addition, some elements are not shown in FIG. 10 for sake of clarity in exposition such as buses and various circuits such as timing sources, peripherals, analog-to-digital and digital-to-analog converters, voltage regulators, and power management circuits, and the like which are well known in the art, and therefore, will not be described any further.

A controller/processor 1005 implements the functionality of the L2 layer 910 shown in FIG. 9 and described in the accompanying text. The controller/processor 1005 may include one or more sub-processors 1010 or cores that are configured to handle specific tasks or functions. The controller/processor 1005 typically provides header compression, ciphering, packet segmentation and reordering, multiplexing between logical and transport channels, and radio resource allocations to the UE based on various priority metrics. The controller/processor 1005 is also responsible for HARQ operations, retransmission of lost packets, and signaling to the UE.

An RF processor 1015 implements various signal processing functions for the downlink including the L1 layer 905 (i.e., physical layer) shown in FIG. 9 and described in the accompanying text. The RF processor 1015 may include one or more sub-processors 1020 or cores that are configured to handle specific tasks or functions. Exemplary signal processing functions include coding and interleaving to facilitate forward error correction (FEC) at the UE and mapping to signal constellations based on various modulation schemes (e.g., binary phase-shift keying (BPSK), quadrature phase-shift keying (QPSK), M-phase-shift keying (M-PSK), and M-quadrature amplitude modulation (M-QAM)). The coded and modulated symbols are then split into parallel streams. Each stream is then mapped to an OFDM (orthogonal frequency-division multiplexing) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator (not shown) may be used to determine the coding and modulation scheme, as well as for spatial processing. The channel estimate may be derived from a reference signal and/or channel condition feedback transmitted by the UE. Each spatial stream is then provided to an antenna via a transmitter that modulates an RF carrier with a respective spatial stream for transmission.

A memory 1025 stores computer-readable code 1030 that is executable by one or more processors in the beacon cell 505 including the controller/processor 1005 and/or the RF processor 1015. The memory 1025 may also include various data sources and data sinks (collectively represented by element 1035) that may provide additional functionalities. For example, a data sink may be used to facilitate L3 layer processing to the extent that such upper layer processing is implemented on the beacon cell.

The code 1030 in typical deployments is arranged to be executed by the one or more processors to implement the beacon identity features shown in FIG. 5, including power utilization, timing offsets, and selective operations, as well as the modifications to the transport and physical channels shown in FIG. 6 via control of the L1 and/or L2 layers (elements 905 and 910 respectively in FIG. 9). The code 1030 additionally enables implementation of both the beacon cell identity and live identity using the same hardware infrastructure in a given beacon cell when executed.

The hardware infrastructure may also include various interfaces (I/Fs) including a communication I/F 1040 which may be used, for example, to implement a link to the services node 130 (FIG. 1), LAN, or to an external processor, control, or data source. In some cases, a user I/F 1045 may be utilized to provide various indications such as power status or to enable some local control of features or settings.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of operating a radio node in a small cell network, the method comprising the steps of:
   configuring the radio node with dual identities, a first identity of the dual identities being a beacon identity and the second identity of the dual identities being a live identity;
   instantiating a magic PSC (primary scrambling code) in the radio node to identify the beacon identity to UE (user equipment) during cell discovery, a magic PSC being a PSC that is included in a neighbor list broadcast by a macrocell to facilitate selection;
   instantiating a non-magic PSC in the radio node to identify the live identity to the UE;
   operating the beacon identity so that the radio node transmits at a minimum signal quality level needed for reselection of the radio node by the UE from a neighboring macrocell;
   capturing the UE into the small cell network via reselection from the macrocell to a beacon cell using the magic PSC;
   enabling the UE to reselect to the live identity from the beacon identity after capture of the UE; and
   operating the live identity in a conventional manner for a small cell.

2. The method of claim 1 in which the beacon identity is operated at a reduced power level compared to the live identity, or at a substantially similar power level to the live identity.

3. The method of claim 2 in which the power level of the beacon identity is approximately 5 dB lower than the live identity power level.

4. The method of claim 1 including a further step of deploying a plurality of beacon cells in the small cell network, each of the beacon cells among the plurality sharing a common magic PSC.

5. The method of claim 4 including a further step of operatively coupling one or more beacon cells in the small cell network to a services node, the services node providing connectivity to a core network of a mobile operator.

6. The method of claim 4 including a further step of deploying small cells identified using magic PSCs other than the commonly shared magic PSC.

7. The method of claim 1 in which the step of operating comprises reconfiguring one or more channels in a downlink to the UE.

8. The method of claim 7 in which the reconfiguring comprises operating the one or more channels at levels that are cumulatively no greater than approximately 20% of a normal power level for a small cell, the one or more channels comprising PSCH (Primary Synchronization Channel), SSCH (Secondary Synchronization Channel), CPICH (Common Pilot Channel), and PCCPCH (Primary Common Control Physical Channel).

9. The method of claim 7 in which the reconfiguring comprises optimizing a BCH (Broadcast Channel) by implementing one or more modifications to an SIB (System Information Block), the modifications selected from SIB3 containing a dummy cell Id, low values for intrafrequency searching, short timers, or low reselection hysteresis, SIB5 containing a very low value for RACH (Random Access Channel) maximum transmit power, a large backoff for RACH retransmits, fewer RACH reattempts, or a dummy configuration for SCCPCH (Secondary Common Control Physical Channel), SIB11 containing only a PSC of a live cell in a neighbor list with large, negative offsets, compressing SIB11 into a single segment, dropping SIB2, or fitting one or more SIBs into a repetition cycle of 16.

10. The method of claim 1 including a further step of scheduling a fixed or deliberate timing offset between the beacon identity and the live identity to improve UE reselection behavior.

11. The method of claim 1 in which the small network, macrocell, and UE are operational in accordance with UMTS (Universal Mobile Telecommunications System) under 3GPP (Third Generation Partnership Project).

12. The method of claim 1 in which a power level of the beacon identity is configured to be one of static, variable, a function of a duty cycle, based on residual power of the live identity of the small cell, or based on throughput requirements of users attached to the live identity of the small cell.

13. The method of claim 1 including a further step of deploying a plurality of beacon cells in the small network, each of the beacon cells among the plurality using multiple magic PSCs.

14. The method of claim 8 including a further step of enabling an AICH (Acquisition Indicator Channel) channel.

15. The method of claim 14 including a further step of sending NACKs (non-acknowledgements) on the AICH channel to prevent UEs from attempting to PRACH (physical random access channel) on the beacon identity.

16. The method of claim 15 including a further step of enabling an SCCPCH (Secondary Common Control Physical Channel) and using RRC (Radio Resource Control) reject messages to influence UE behavior.

17. One or more computer-readable media containing instructions which, when executed by one or more processors disposed in an electronic device, implement the method of claim 1.

18. One or more computer-readable media containing instructions which, when executed by one or more processors disposed in an electronic device, implement a method for facilitating reselection of user equipment (UE) from a macrocell to a small cell in a small cell network, the method comprising the steps of:

manipulating channels transmitted over a downlink between the small cell and a UE to create a selectively operable beacon identity for the small cell, the beacon identity being configured to enable the UE to discover the beacon identity at a minimum signal quality level for the transmitted channels, the beacon identity being identified by a magic PSC (Primary Scrambling Code) to enable reselection to the small cell when the beacon identity is operated; and selectively operating the beacon identity so that the small cell is switched from functioning as a beacon cell to enable reselection to functioning as a conventional small cell, the conventional small cell being identified by a non-magic PSC to enable handover of the UE to neighboring small cells in the small cell network.

19. The one or more computer-readable media of claim 18 in which the method further comprises linking the selective operation of the beacon identity to a control object, the control object being cognizant of conditions on the small cell network or implementing a duty cycle for the beacon identity.

20. The one or more computer-readable media of claim 19 wherein the method further comprises the conditions comprising UE loading on the small cell network.

21. The one or more computer-readable media of claim 19 wherein the method further comprises the control object which is either instantiated locally in the small cell or is instantiated remotely from the services node.

22. A method of deploying small cells in a small cell network in an indoor enterprise space, the method comprising the steps of:

locating a plurality of beacon cells within the indoor enterprise space, the locations providing substantially contiguous radio coverage within selected portions of the space, each of the beacon cells among the plurality being configured with dual identities, a first identity of the dual identities being a beacon identity having a magic PSC (primary scrambling code) that is commonly shared among the beacon cells, the commonly shared magic PSC identifying the beacon identity to UE (user equipment) for reselection, and the second identity of the dual identities being a live identity having a non-magic PSC for identifying the live identity to UE for handover;

manually locating one or more magic PSC cells within the indoor enterprise space, each magic PSC cell using a unique magic PSC that is not the commonly shared magic PSC;

operating the beacon cells and magic PSC cells to facilitate capture of the UE via reselection from a macrocell to either a magic PSC cell or to a beacon identity of a beacon cell; and handing over the UE to a neighboring small cell as the UE moves within the indoor enterprise space.

23. The method of claim 22 in which the beacon identity is created by operating the beacon cell so that broadcast channels are transmitted at minimum requirements for reselection of the beacon cell by the UE.

24. The method of claim 23 in which the broadcast channels of the beacon identity include a nominal timing offset compared to broadcast channels of the live identity.

25. The method of claim 22 including a further step of switching the beacon cell between the beacon identity and the live identity so that the beacon cell has only one identity at time.

26. The method of claim 22 in which the beacon identity and live identity are operated substantially simultaneously.

* * * * *